United States Patent [19]
Allenby

[11] Patent Number: 5,921,842
[45] Date of Patent: Jul. 13, 1999

[54] MULTIPLE GAME CALL

[76] Inventor: Randy Allenby, P.O. Box 188, Rivesville, W. Va. 26588

[21] Appl. No.: 09/001,437

[22] Filed: Dec. 31, 1997

[51] Int. Cl.$^6$ ........................................... A63H 5/00
[52] U.S. Cl. ............................. 446/397; 446/404
[58] Field of Search ...................... 446/397, 402

[56] References Cited

U.S. PATENT DOCUMENTS

| | | | |
|---|---|---|---|
| 1,449,756 | 3/1923 | Jackson | 446/397 |
| 2,958,157 | 11/1960 | Tannehill | 446/397 |
| 4,310,986 | 1/1982 | Jacobs | 446/397 |
| 4,343,108 | 8/1982 | Lee | 446/397 |
| 4,527,985 | 7/1985 | Zoschg | 446/397 |
| 4,606,733 | 8/1986 | Willis | 446/397 |
| 4,648,852 | 3/1987 | Wingate | 446/397 |
| 4,846,753 | 7/1989 | Langston | 446/397 |
| 4,862,625 | 9/1989 | Dolan | 43/1 |
| 4,941,858 | 7/1990 | Adams | 446/397 |
| 4,988,325 | 1/1991 | Alderson | 446/397 |
| 5,352,146 | 10/1994 | Shuart | 446/397 |
| 5,380,235 | 1/1995 | Forbes | 446/397 |
| 5,484,319 | 1/1996 | Battey | 446/397 |
| 5,503,585 | 4/1996 | Heineman | 446/397 |

*Primary Examiner*—Robert A. Hafer
*Assistant Examiner*—Kurt Fernstrom

[57] ABSTRACT

A turkey calling device is provided including a housing having a periphery including a front face, a rear face, and a pair of side faces defining an interior space. Next provided is a paddle mechanism pivotally coupled to the housing for producing a first sound upon the pivoting thereof. Also included is a slate mechanism mounted to the housing for producing a second sound upon the striking thereof with a hand held striker. Finally, a plunger mechanism is slidably mounted on the housing for producing a third sound upon the reciprocation thereof.

4 Claims, 2 Drawing Sheets

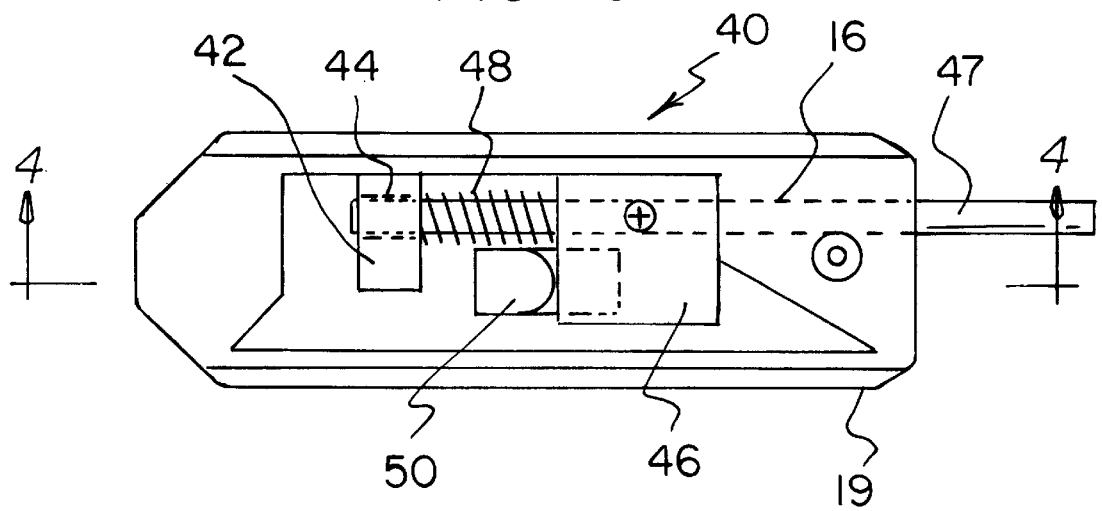
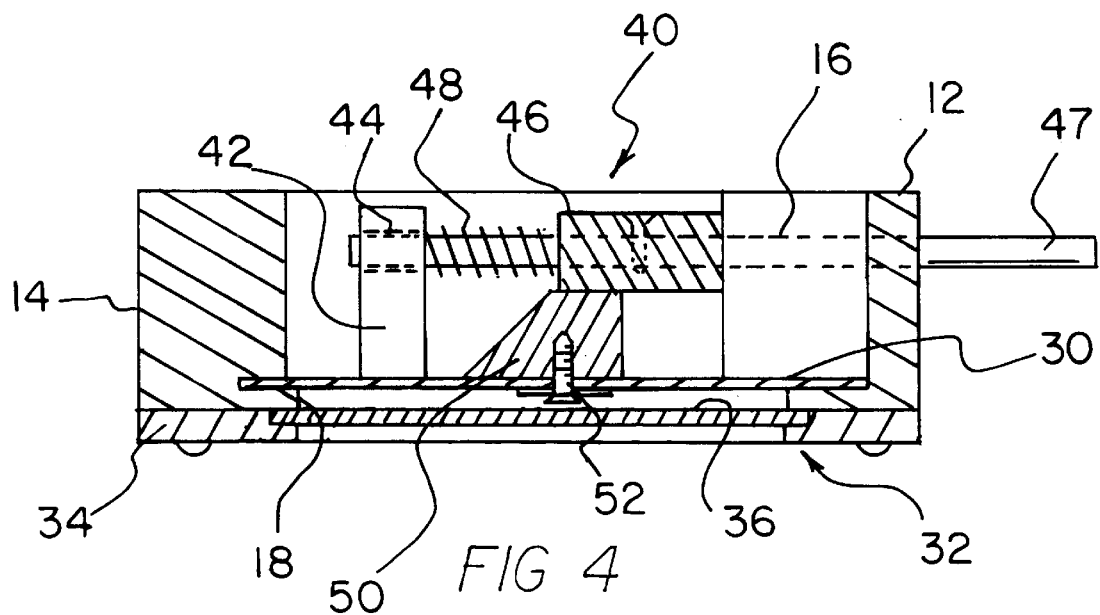

MULTIPLE GAME CALL

BACKGROUND OF THE INVENTION

1. Field of the Invention

The present invention relates to game calls and more particularly pertains to a new multiple game call for allowing a user to produce three different calls with a single compact, easily carried device.

2. Description of the Prior Art

The use of game calls is known in the prior art. More specifically, game calls heretofore devised and utilized are known to consist basically of familiar, expected and obvious structural configurations, notwithstanding the myriad of designs encompassed by the crowded prior art which have been developed for the fulfillment of countless objectives and requirements.

Known prior art game calls include those set forth in U.S. Pat. No. 4,207,703; U.S. Pat. No. 4,941,858; U.S. Pat. No. 4,179,845; U.S. Pat. No. 4,988,325; U.S. Pat. No. 5,251,569; and U.S. Pat. No. 4,612,001.

In these respects, the multiple game call according to the present invention substantially departs from the conventional concepts and designs of the prior art, and in so doing provides an apparatus primarily developed for the purpose of allowing a user to produce three different calls with a single compact, easily carried device.

SUMMARY OF THE INVENTION

In view of the foregoing disadvantages inherent in the known types of game calls now present in the prior art, the present invention provides a new multiple game call construction wherein the same can be utilized for allowing a user to produce three different calls with a single compact, easily carried device.

The general purpose of the present invention, which will be described subsequently in greater detail, is to provide a new multiple game call apparatus and method which has many of the advantages of the game calls mentioned heretofore and many novel features that result in a new multiple game call which is not anticipated, rendered obvious, suggested, or even implied by any of the prior art game calls, either alone or in any combination thereof.

To attain this, the present invention generally comprises a housing with a generally rectangular configuration. The housing has a periphery including a square front face, a square rear face, and a pair of rectangular side faces. The housing thus defines an interior space, an open bottom and an open top. The housing is equipped with an aperture formed in the rear face thereof adjacent to the open top and one of the side faces thereof. As shown in FIG. 4, a peripheral lip is integrally coupled to a bottom edge of the periphery and extends inwardly therefrom. It should be noted that the open top has a top periphery that defines a portion of a cylinder. Next provided is a paddle having a rectangular configuration with an inboard extent and an outboard extent. The inboard extent has a lower surface which defines the cylinder and the outboard end has a reduced width and a length less than ½ that of the inboard extent. As shown in FIGS. 1 & 2, an inboard end of the paddle is pivotally coupled to the housing above the rear face thereof. An outboard end has a cubical thickened portion for gripping purposes. During use, upon the pivoting of the paddle in a reciprocating motion, the lower surface thereof slidably abuts the top periphery of the housing thereby creating a first sound. Shown in FIG. 4 is a laminate sheet having a pair of short edges and a pair of long edges. One of the short edges is coupled to the rear face of the housing within the interior space thereof such that the remaining edges reside on an upper surface of the peripheral lip of the housing. With reference still to FIG. 4, it is shown that a slate assembly is provided including a cover having a rectangular configuration with a shape and size similar to that of the periphery of the housing. A rectangular cut out is formed in the slate cover with a size and shape similar to that of an inner periphery of the peripheral lip of the housing. The slate assembly further includes a slate mounted below the laminate and spaced therefrom by way of the cover which is attached to the periphery of the housing. In operation, upon the striking of the slate with a hand held striker, a second sound is produced. Finally, a rod assembly includes a rod mount block coupled to one of the side faces of the housing within the interior space thereof. For reasons that will become apparent later, the rod mount block has a bore formed therein which is in coaxial alignment with the aperture of the housing. The rod assembly further includes a rod slidably situated within the aperture of the housing and the bore of the rod mount block. A rectilinear striker block is coupled about an intermediate extent of the rod. Situated about the rod between the rod mount block and the striker block is a spring that functions such that the plunger has a biased depressed orientation and an unbiased extended orientation. Lastly, an engagement block is included having a bottom planar surface coupled to a central extent of a top surface of the laminate sheet between the rod mount block and the rear face of the housing. The engagement block is equipped with a top surface having a beveled front extent and a square horizontally oriented rear extent in slidable abutment with the striker block. Upon the reciprocation of the plunger, the striker block and the engagement block slidably abut to create a third sound.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new multiple game call apparatus and method which has many of the advantages of the game calls mentioned heretofore and many novel features that result in a new multiple game call which is not anticipated, rendered obvious, suggested, or even implied by any of the prior art game calls, either alone or in any combination thereof.

It is another object of the present invention to provide a new multiple game call which may be easily and efficiently manufactured and marketed.

It is a further object of the present invention to provide a new multiple game call which is of a durable and reliable construction.

An even further object of the present invention is to provide a new multiple game call which is susceptible of a low cost of manufacture with regard to both materials and labor, and which accordingly is then susceptible of low prices of sale to the consuming public, thereby making such multiple game call economically available to the buying public.

Still yet another object of the present invention is to provide a new multiple game call which provides in the apparatuses and methods of the prior art some of the advantages thereof, while simultaneously overcoming some of the disadvantages normally associated therewith.

Still another object of the present invention is to provide a new multiple game call for allowing a user to produce three different calls with a single compact, easily carried device.

Even still another object of the present invention is to provide a new multiple game call that includes a housing having a periphery with a front face, a rear face, and a pair of side faces defining an interior space. Next provided is a paddle mechanism pivotally coupled to the housing for producing a first sound upon the pivoting thereof. Also included is a slate mechanism mounted to the housing for producing a second sound upon the striking thereof with a hand held striker. Finally, a plunger mechanism is slidably mounted on the housing for producing a third sound upon the reciprocation thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top cross-sectional view of the present invention taken along line 3—3 shown in FIG. 1.

FIG. 4 is a side cross-sectional view of the present invention taken along line 4—4 shown in FIG. 3.

DESCRIPTION OF THE PREFERRED EMBODIMENT

Figure 1:
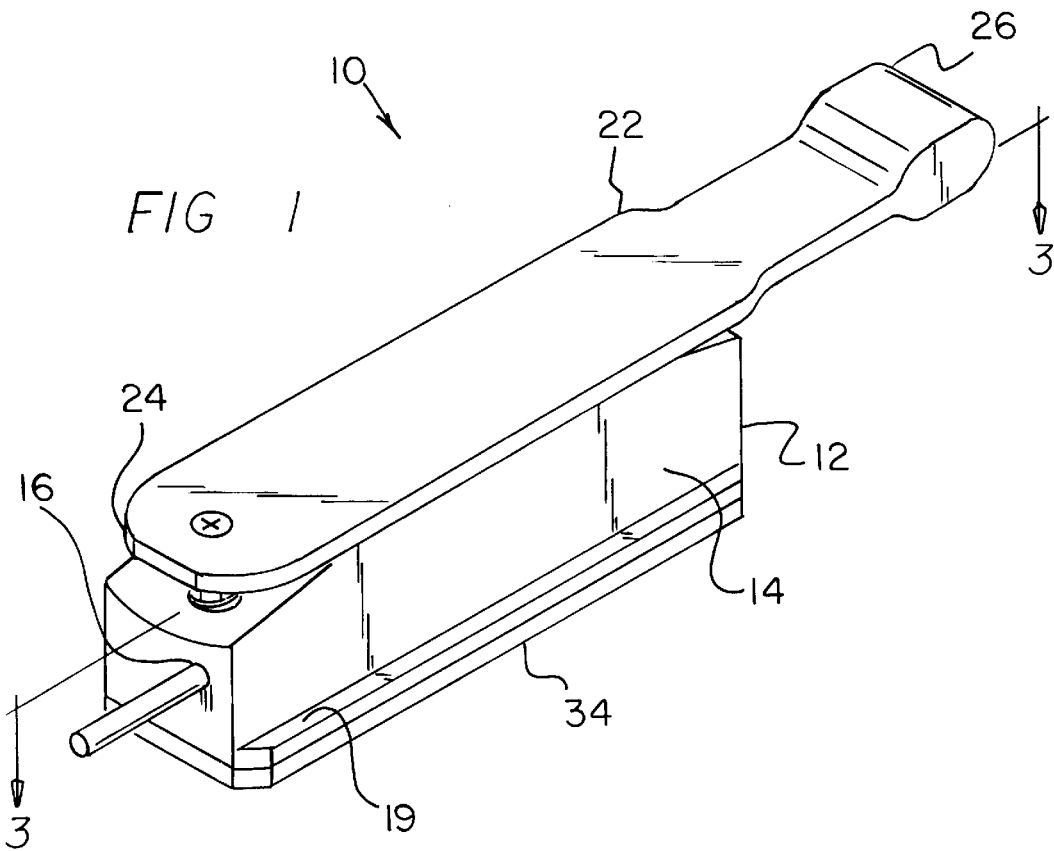
FIG. 1 is a perspective view of a new multiple game call according to the present invention.

With reference now to the drawings, and in particular to FIGS. 1 through 4 thereof, a new multiple game call embodying the principles and concepts of the present invention and generally designated by the reference numeral 10 will be described.

The present invention, as designated as numeral 10, includes a housing 12 with a generally rectangular configuration. The housing has a periphery 14 including a square front face, a square rear face, and a pair of rectangular side faces. The housing thus defines an interior space, an open bottom and an open top. Preferably, the housing has a length of less than 8 inches.

Figure 2:
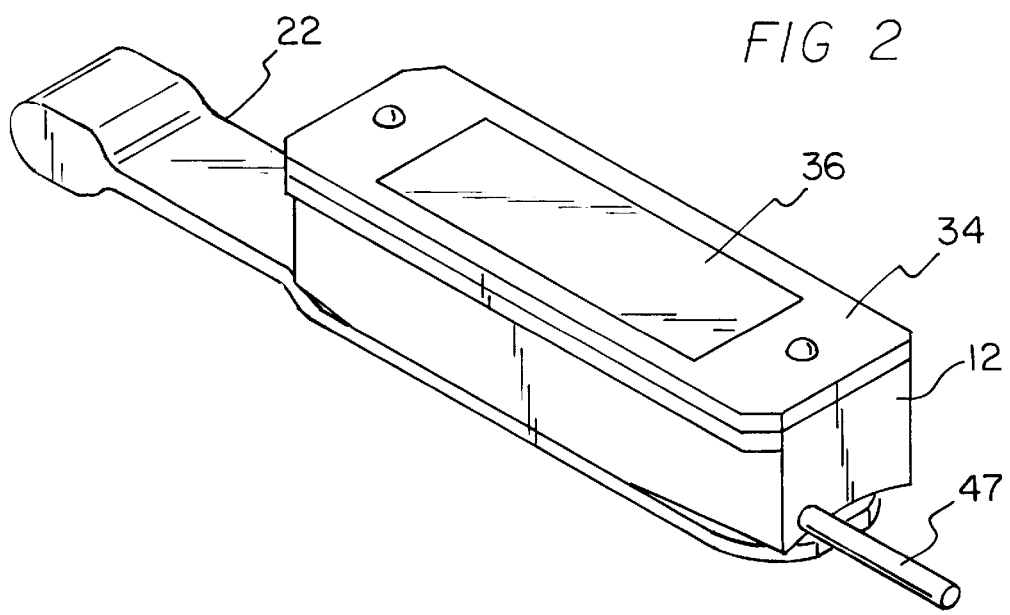
FIG. 2 is a bottom perspective view of the present invention.

The housing is equipped with an aperture 16 formed in the rear face adjacent to the open top and one of the side faces thereof. As shown in FIG. 4, a peripheral lip 18 is integrally coupled to a bottom edge of the periphery and extends inwardly therefrom. Associated therewith is an outwardly extending lip 19 formed in coplanar relationship with the peripheral lip 18, as shown in FIG. 2. It should be noted that the open top has a top periphery that defines a portion of a cylinder.

Next provided is a paddle 22 having a rectangular configuration with an inboard extent and an outboard extent. The inboard extent has a lower surface which defines the cylinder. The outboard end has a reduced width and a length less than ½ that of the inboard extent. As shown in FIGS. 1 & 2, an inboard end 24 of the paddle is pivotally coupled to the housing above the rear face thereof. An outboard end 26 has a cubical thickened portion for gripping purposes. During use, upon the pivoting of the paddle in a reciprocating motion, the lower surface thereof slidably abuts the top periphery of the housing thereby creating a first sound. Such sound is produced by the frictional relationship between the paddle and the housing. While the paddle may be constructed from any one of various types of wood, red cedar is preferably employed in the preferred embodiment. As an option, a spring may be coupled between the paddle and the housing about the point of pivotal coupling for urging the paddle to reside in a rest position above the housing.

Shown in FIG. 4 is a thin laminate sheet 30 formed of birch wood and having a pair of short edges and a pair of long edges. One of the short edges is coupled to the rear face of the housing within the interior space thereof such that the remaining edges reside on an upper surface of the peripheral lip of the housing.

With reference still to FIG. 4, it is shown that a slate assembly 32 is provided including a cover 34 having a rectangular configuration with a shape and size similar to that of the periphery of the housing. A rectangular cut out is formed in the slate cover with a size and shape similar to that of an inner periphery of the peripheral lip of the housing. The slate assembly further includes a slate 36 mounted below the laminate and spaced therefrom by way of the cover which is attached to the periphery of the housing. In operation, upon the striking of the slate with an unillustrated hand held striker, a second sound is produced. Such striker preferably takes the form of a handle with a conical wooden head or the like mounted at an end thereof.

Finally, a rod assembly 40 includes a rod mount block 42 coupled to one of the side faces of the housing within the interior space thereof. For reasons that will become apparent later, the rod mount block has a bore 44 formed therein which is in coaxial alignment with the aperture of the housing. The rod assembly further includes a rod 47 slidably situated within the aperture of the housing and the bore of the rod mount block. The rear face of the housing ideally has a thickness of about ¼ the length of the housing to provide both a secure area for coupling the paddle and for mounting the rod of the rod assembly. A rectilinear striker block 46 is coupled about an intermediate extent of the rod. Such striker block is ideally formed of white oak. Situated about the rod between the rod mount block and the striker block is a spring 48 that functions such that the plunger has a biased depressed orientation and an unbiased extended orientation.

Lastly, a red cedar engagement block 50 is included having a bottom planar surface coupled to a central extent of a top surface of the laminate sheet between the rod mount block and the rear face of the housing. The engagement block is equipped with a top surface having a beveled front extent and a square horizontally oriented rear extent in slidable abutment with the striker block. As shown in FIG. 3, the engagement block and rod reside in separate planes. The engagement block is oriented and the striker block has a length such that a slidable engagement is afforded with the rear extent of the engagement block over the entire range of motion of the rod and striker block. It should be noted that a screw and washer combination 52 is employed to couple the engagement block with the laminate sheet. Upon the reciprocation of the plunger, the striker block and the engagement block slidably abut to create a third sound.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A turkey calling device comprising, in combination:

a housing with a generally rectangular configuration having a periphery including a square front face, a square rear face, and a pair of rectangular side faces defining an interior space, an open bottom and an open top, the housing having an aperture formed in the rear face thereof adjacent to the open top and one of the side faces thereof and an inwardly extending peripheral lip integrally coupled to a bottom edge of the periphery and extending inwardly therefrom, the housing further having a outwardly extending lip formed in coplanar relationship with the inwardly extending peripheral lip, whereby the open top has a top periphery that defines a portion of a cylinder;

a paddle constructed from red cedar having a rectangular configuration with an inboard extent having a lower surface which defines the cylinder and an outboard end having a reduced width and a length less than ½ that of the inboard extent, the paddle having an inboard end pivotally coupled to the housing above the rear face thereof and an outboard end with a cubical thickened portion for gripping purposes, whereby upon the pivoting of the paddle in a reciprocating motion, the lower surface thereof slidably abuts the top periphery of the housing thereby creating a first sound, wherein a spring is coupled between the paddle and the housing for urging the paddle to reside in a rest position above the housing;

a laminate sheet having a pair of short edges and a pair of long edges, one of the short edges coupled to the rear face of the housing within the interior space thereof such that the remaining edges reside on an upper surface of the inwardly extending peripheral lip of the housing;

a slate assembly including a cover having a rectangular configuration with a shape and size similar to that of the periphery of the housing and a rectangular cut out formed in the slate cover with a size and shape similar to that of an inner periphery of the inwardly extending peripheral lip of the housing, the slate assembly further including a slate mounted below the laminate and spaced therefrom by way of the cover which is attached to the periphery of the housing with a recess for receiving the slate, whereby upon the striking of the slate, a second sound is produced; and a rod assembly including a rod mount block coupled to one of the side faces of the housing within the interior space thereof and spaced from the front and rear faces of the housing with the rod mount block having a bore formed therein which is in coaxial alignment with the aperture of the housing, the rod assembly further including a rod slidably situated within the aperture of the housing and the bore of the rod mount block such that an end of the rod remains entirely within the housing, a striker block constructed from white oak coupled about an intermediate extent of the rod, a spring situated about the rod between the rod mount block and the striker block such that the rod has a biased depressed orientation and an unbiased extended orientation, and an engagement block constructed from red cedar having a bottom planar surface coupled to a central extent of a top surface of the laminate sheet via a screw and washer combination between the rod mount block and the rear face of the housing and a top surface having a beveled front extent and a square horizontally oriented rear extent in slidable abutment with the striker block, whereby upon the reciprocation of the rod, the striker block and the engagement block slidably abut to create a third sound;

wherein the rear face of the housing has a thickness about ¼ a length of the housing for providing a secure area for coupling the paddle and mounting the rod of the rod assembly.

2. A game calling device comprising:

a housing having a periphery including a front face, a rear face, and a pair of side faces defining an interior space, the housing having an aperture formed therein and an inwardly extending peripheral lip integrally coupled to a bottom edge of the periphery and extending inwardly therefrom;

a paddle having an inboard end pivotally coupled to the housing, whereby upon the pivoting of the paddle in a reciprocating motion, the lower surface thereof slidably abuts a top periphery of the housing thereby creating a first sound;

a laminate sheet situated on a bottom of the housing and coupled to an upper surface of the inwardly extending peripheral lip of the housing;

a rod assembly including a rod slidably situated within the aperture of the housing, a striker block coupled about an intermediate extent of the rod, a spring situated about the rod such that the rod has a biased depressed orientation and an unbiased extended orientation, and an engagement block having a bottom planar surface coupled to the laminate sheet and a top surface in slidable abutment with the striker block, whereby upon the reciprocation of the rod, the striker block and the engagement block slidably abut to create another sound;

wherein a slate assembly includes a slate coupled to the bottom of the housing in spaced relationship with the laminate sheet, whereby upon the striking of the slate, another sound is produced;

wherein a rod mount block is coupled to one of the side faces of the housing with a bore formed therein through which the rod is slidably situated;

wherein an outboard extent of the paddle and the rod extend from opposite ends of the housing.

3. A game calling device as set forth in claim 2 wherein an open top of the housing and a lower surface of the paddle define a portion of a cylinder.

4. A game calling device as set forth in claim 2 wherein the engagement block is coupled to the laminate sheet by way of a washer and screw.

* * * * *